3,155,676
PROCESS OF PREPARING PYRIDYL ALKYL KETONES

Ralph H. Feldhake, Indianapolis, Ind., assignor to Reilly Tar & Chemical Corporation, Indianapolis, Ind., a corporation of Indiana
No Drawing. Filed Dec. 26, 1961, Ser. No. 162,236
10 Claims. (Cl. 260—297)

My present invention relates to a chemical process. More particularly it relates to a process of preparing pyridyl alkyl ketones.

Pyridyl alkyl ketones have been prepared in a variety of ways. Cyanopyridines have been converted to the pyridyl alkyl ketones with alkyl magnesium iodide [Teague et al., J. Am. Chem. Soc., 75, 3429–30 (1953)]. Pyridine carboxylic acid esters can be reacted with acetic acid esters in the presence of sodium ethoxide to give pyridyl alkyl ketones [Gilman et al., J. Am. Chem. Soc., 68, 2399–2400 (1946)]. Calcium acetate fused with calcium nicotinate has been used to make 3-pyridyl methyl ketone [Engler et al., Ber. 22, 597–9 (1889)]. 3-pyridyl methyl ketone has been prepared by passing a mixture of ethyl nicotinate and acetic acid over a catalyst [Webb et al., J. Am. Chem. Soc., 71, 2285–6 (1949)].

The prior art processes, while useful for the preparation of pyridyl alkyl ketones on a laboratory scale, are not particularly suitable for commerical production. I have found that I can prepare pyridyl alkyl ketones by the vapor phase reaction of a cyanopyridine, an alkyl nitrile, and water.

In carrying out my invention, I prepare a gaseous mixture of a cyanopyridine, an alkyl nitrile, and water. This mixture of vapors is passed through a suitable reactor containing a catalyst. The temperature of the reactor is maintained between about 250° C. and 650° C., and preferably between about 400° C. and 500 C. I prefer to conduct my process in a continuous manner, although that is not necessary.

The reactor used may be of various types. I prefer the type normally used in carrying out cracking operations in the petroleum industry. Such reactors are of tubular form with suitable connections at entrance and exit. They are provided with means for supporting the bed of catalyst, and are provided with any convenient means for heating them.

The catalyst used may be any of a large number of catalysts which are useful in the preparation of ketones from alkyl carboxylic acids. In general these catalysts are compounds of elements of Groups II and III of the periodic table having an atomic number between 12 and 58 inclusive, a compound of a metallic element of Group IV, a compound of an element of series 4 of the periodic table having an atomic number between 23 and 28 inclusive, and mixtures thereof. The catalysts are usually deposited on standard catalyst supports, such as alumina, silica, silica-alumina, and the like.

A satisfactory way of carrying out my invention is as follows. The parts are by weight.

Example 1.—3-Acetylpyridine

I prepare a gaseous mixture composed of 129.5 parts of 3-cyanopyridine, 224 parts of water, and 205 parts of acetonitrile. I pass the mixture of vapors through a reactor containing a catalytic bed of thoria-alumina catalyst, (10% $ThO_2$ on alumina). The temperature of the reactor is maintained at about 450° C. As the vapors of 3-cyanopyridine, water, and acetonitrile pass through the reactor, a reaction occurs whereby 3-acetylpyridine (3-pyridyl methyl ketone) is formed. The vapors of the unchanged reactants and the reaction products are condensed as they emerge from the reactor, and the condensate is collected in a suitable receiver. The crude condensate is fractionally distilled under high vacuum to separate the 3-acetylpyridine.

In place of the thoria-alumina catalyst, I may use a large number of other catalysts. Among the catalysts I have found useful in carrying out my reaction are the catalysts which are useful in the preparation of ketones by the decomposition of aliphatic carboxylic acids. Such catalysts include, in addition to the thoria-alumina, uranium dioxide, manganese oxide, alumina, alkaline earth oxides, lead salts, copper, coke zinc oxide, chromium oxide, vanadium oxide, silica-alumina, and the like, as well as mixtures of these.

My invention does not reside in the discovery of a new catalyst. What I have discovered is that the interaction of a cyanopyridine and an aliphatic nitrile in the presence of water vapor yields pyridyl alkyl ketones in good yields. My process is useful not only for the prepartion of pyridyl alkyl ketones from the lower alkane nitriles, but also from higher alkane nitriles such, for example, as lauric, palmitic, stearic, and the like.

In Example 1 the molecular equivalents of the reactants used are 3-cyanopyridine one mole, water ten mols, and acetonitrile four mols. I need not, however, use the specific molal ratios of Example 1. The proportion of the reactants may be varied widely. In general, I prefer to use an excess of water and acetonitrile.

The temperature at which my reaction may be conducted may be varied widely. In general, I prefer to have the reaction temperatures above about 400° C. and below about 550° C. More desirably, I prefer that the reaction temperatures should be between about 425° C. and 500° C.

Example 2.—4-Acetylpyridine

The procedure of Example 1 is repeated with the exception that 4-cyanopyridine is used in place of the 3-cyanopyridine and 4-acetylpyridine is recovered.

Example 3.—3,5-Diacetylpyridine

The procedure of Example 1 is repeated with the exception that I use 50 parts of 3,5-dicyanopyridine in place of the 100 parts of 3-cyanopyridine and I recover 3,5-diacetylpyridine.

Example 4.—3-Methyl-5-Acetylpyridine

The procedure of Example 1 is repeated with the exception that I use 3-methyl-5-cyanopyridine in place of the 3-cyanopyridine, and I recover 3-methyl-5-acetylpyridine.

Example 5.—2-Acetylpyridine

The procedure of Example 1 is repeated with the exception that I use 2-cyanopyridine in place of the 3-cyanopyridine, and I recover 2-acetylpyridine. The yields of 2-acetylpyridine are not as good as are those of 3-acetylpyridine. The presence of a considerable amount of pyridine in the reaction product indicates that the 2-cyanopyridine tends to undergo decyanation.

Example 6.—3-Butyrylpyridine

The procedure of Example 1 is repeated with the exception that I use 225 parts of butyronitrile in place of the 205 parts of acetonitrile, and I recover 3-pyridyl propyl ketone (3-butyrylpyridine).

Example 7.—3-Ethyl-4-Acetylpyridine

The procedure of Example 1 is repeated with the exception that I use 3-ethyl-4-cyanopyridine in place of the 3-cyanopyridine, and I recover 3-ethyl-4-acetylpyridine.

Example 8.—3-Dodecylpyridyl Ketone

The procedure of Example 1 is repeated with the exception that I use 700 parts of dodecylnitrile ($C_{11}H_{23}$·CN) in place of the 205 parts of acetonitrile.

This application is a continuation-in-part of my application Serial Number 40,546, filed July 5, 1960, now abandoned.

I claim as my invention:

1. The process of preparing pyridyl alkyl ketones which comprises a vapor-phase interaction of cyanopyridine, alkane nitrile the alkane group having not more than 18 carbon atoms, and water in the presence of a catalyst support and a catalyst selected from the group consisting of a compound of an element of Groups II and III of the periodic table having an atomic number between 12 and 58 inclusive, a compound of a metallic element of Group IV, a compound of an element of series 4 of the periodic table having an atomic number between 23 and 28 inclusive, and mixtures thereof, maintained at a temperature between about 250° C. and 650° C.

2. The process of preparing pyridyl alkyl ketones which comprises a vapor-phase interaction of cyanopyridine, alkane nitrile the alkane group having not more than 18 carbon atoms, and water in the presence of a catalyst support and a catalyst selected from the group consisting of a compound of an element of Groups II and III of the periodic table having an atomic number between 12 and 58 inclusive, a compound of a metallic element of Group IV, a compound of an element of series 4 of the periodic table having an atomic number between 23 and 28 inclusive, and mixtures thereof, maintained at a temperature between about 400° C. and 550° C.

3. The process of claim 2 in which the cyano-pyridine used is 3-cyanopyridine and the alkyl nitrile is acetnitrile.

4. The process of claim 2 in which the cyano-pyridine used is 4-cyanopyridine and the alkyl nitrile is acetonitrile.

5. The process of claim 2 in which the cyanopyridine used is 2-cyanopyridine and the alkyl nitrile is acetonitrile.

6. The process of claim 2 in which the cyanopyridine used is 3,5-dicyanopyridine and the alkyl nitrile is acetonitrile.

7. The process of claim 2 in which a thoria-alumina catalyst is used.

8. The process of claim 3 in which a thoria-alumina catalyst is used.

9. The process of claim 4 in which a thoria-alumina catalyst is used.

10. The process of claim 5 in which a thoria-alumina catalyst is used.

No references cited.